(12) United States Patent
Budampati et al.

(10) Patent No.: US 8,463,319 B2
(45) Date of Patent: Jun. 11, 2013

(54) WIRELESS APPLICATION INSTALLATION, CONFIGURATION AND MANAGEMENT TOOL

(75) Inventors: Ramakrishna S. Budampati, Maple Grove, MN (US); Anoop Mathur, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 906 days.

(21) Appl. No.: 11/160,314

(22) Filed: Jun. 17, 2005

(65) Prior Publication Data

US 2006/0287001 A1    Dec. 21, 2006

(51) Int. Cl.
| | |
|---|---|
| H04M 1/00 | (2006.01) |
| H04M 3/00 | (2006.01) |
| H04W 72/00 | (2009.01) |
| H04W 4/00 | (2009.01) |
| H04B 7/216 | (2006.01) |
| H04L 27/00 | (2006.01) |
| H04L 27/06 | (2006.01) |
| G06F 15/16 | (2006.01) |
| G06F 9/44 | (2006.01) |
| G06F 9/445 | (2006.01) |

(52) U.S. Cl.
USPC ............ 455/552.1; 455/418; 455/452.1; 455/550.1; 374/328; 374/331; 374/335; 375/259; 375/343; 709/228; 709/250; 717/168; 717/173; 717/174

(58) Field of Classification Search
USPC .......... 455/418, 419, 550.1, 552.1, 574, 455/423, 432.1, 432.2, 432.3, 435.1, 553.1, 455/66.1, 67.11, 115.1, 115.2, 414.1, 425, 455/87, 88, 127.4, 3.01, 7, 130, 414.3, 420, 455/422.1, 424, 436, 450, 452.1, 464, 509; 370/245, 338, 252, 278, 310, 328, 329, 331, 370/335, 342, 347, 401, 419, 444, 480; 709/200, 709/223, 219, 220, 249; 375/259, 295, 343
See application file for complete search history.

(56) References Cited

U.S. PATENT DOCUMENTS

| | | | |
|---|---|---|---|
| 3,643,183 A | 2/1972 | Geffe | |
| 3,715,693 A | 2/1973 | Fletcher et al. | |

(Continued)

FOREIGN PATENT DOCUMENTS

| | | |
|---|---|---|
| CH | 673184 | 2/1990 |
| DE | 4344172 | 6/1995 |

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner* — Yuwen Pan
*Assistant Examiner* — Paul P Tran
(74) *Attorney, Agent, or Firm* — Seager Tufte & Wickhem LLC.

(57) ABSTRACT

Wireless configuration tools for communicating with and configuring wireless device systems. An illustrative tool makes use of a software defined radio (SDR) to communicate in multiple formats, modes, or frequencies, with multiple wireless device systems that may otherwise be incompatible. In some embodiments, the tool determines what type and how many wireless systems are to be configured prior to configuration of any of the systems. The tool may then adjust how each system is configured to reduce intra-system as well as inter-system interference. Methods for performing such functions are also included.

21 Claims, 3 Drawing Sheets

U.S. PATENT DOCUMENTS

| | | | |
|---|---|---|---|
| 3,758,885 | A | 9/1973 | Voorman et al. |
| 4,264,874 | A | 4/1981 | Young |
| 4,529,947 | A | 7/1985 | Biard et al. |
| 4,614,945 | A | 9/1986 | Brunius et al. |
| 4,812,785 | A | 3/1989 | Pauker |
| 4,843,638 | A | 6/1989 | Walters |
| 5,392,003 | A | 2/1995 | Nag et al. |
| 5,428,602 | A | 6/1995 | Kemppainen |
| 5,428,637 | A | 6/1995 | Oliva, Jr. et al. |
| 5,430,409 | A | 7/1995 | Buck et al. |
| 5,438,329 | A | 8/1995 | Gastouniotis et al. |
| 5,451,898 | A | 9/1995 | Johnson |
| 5,481,259 | A | 1/1996 | Bane |
| 5,642,071 | A | 6/1997 | Sevenhans et al. |
| 5,659,303 | A | 8/1997 | Adair, Jr. |
| 5,726,603 | A | 3/1998 | Chawla et al. |
| 5,767,664 | A | 6/1998 | Price |
| 5,809,013 | A | 9/1998 | Kackman |
| 5,847,623 | A | 12/1998 | Hadjichristos |
| 5,963,650 | A | 10/1999 | Simionescu et al. |
| 5,999,990 | A | 12/1999 | Sharrit et al. |
| 6,052,600 | A * | 4/2000 | Fette et al. ............... 455/509 |
| 6,058,137 | A | 5/2000 | Partyka |
| 6,091,715 | A | 7/2000 | Vucetic et al. |
| 6,122,270 | A * | 9/2000 | Whinnett et al. ............ 370/342 |
| 6,175,860 | B1 | 1/2001 | Gaucher |
| 6,353,846 | B1 | 3/2002 | Fleeson |
| 6,366,622 | B1 | 4/2002 | Brown et al. |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,901,066 | B1 | 5/2005 | Helgeson |
| 6,937,877 | B2 * | 8/2005 | Davenport ............... 455/552.1 |
| 6,954,446 | B2 * | 10/2005 | Kuffner ................... 370/335 |
| 7,149,511 | B1 * | 12/2006 | Bachner et al. ............ 455/419 |
| 2002/0011923 | A1 | 1/2002 | Cunningham et al. |
| 2002/0059434 | A1 * | 5/2002 | Karaoguz et al. ........... 709/228 |
| 2002/0085622 | A1 | 7/2002 | Dhar et al. |
| 2002/0119754 | A1 * | 8/2002 | Wakutsu et al. ............ 455/67.1 |
| 2002/0137514 | A1 * | 9/2002 | Mitsugi et al. ............. 455/436 |
| 2002/0141479 | A1 | 10/2002 | Garcia-Luna-Aceves et al. |
| 2003/0053555 | A1 | 3/2003 | McCorkle et al. |
| 2003/0112779 | A1 * | 6/2003 | Parekh et al. .............. 370/335 |
| 2003/0198280 | A1 | 10/2003 | Wang et al. |
| 2004/0029575 | A1 * | 2/2004 | Mehta ..................... 455/419 |
| 2004/0253996 | A1 | 12/2004 | Chen et al. |
| 2004/0259533 | A1 | 12/2004 | Nixon et al. |
| 2005/0055689 | A1 * | 3/2005 | Abfalter et al. ............ 717/174 |
| 2005/0059427 | A1 * | 3/2005 | Wallace ................... 455/552.1 |
| 2005/0232223 | A1 * | 10/2005 | Muller .................... 370/350 |
| 2005/0281215 | A1 | 12/2005 | Budampati et al. |
| 2006/0073837 | A1 * | 4/2006 | Tanaka et al. ............. 455/453 |
| 2006/0184599 | A1 * | 8/2006 | Wang et al. ............... 708/422 |
| 2006/0221913 | A1 * | 10/2006 | Hermel et al. ............. 370/338 |
| 2006/0234691 | A1 * | 10/2006 | Dygert .................... 455/418 |
| 2007/0061725 | A1 * | 3/2007 | Isaac et al. ................ 715/717 |
| 2008/0141239 | A1 * | 6/2008 | Larsson et al. ............. 717/173 |
| 2009/0098861 | A1 * | 4/2009 | Kalliola et al. ............. 455/414.1 |
| 2009/0190549 | A1 * | 7/2009 | Kim et al. ................. 370/331 |

FOREIGN PATENT DOCUMENTS

| | | |
|---|---|---|
| EP | 0607562 | 7/1994 |
| EP | 0893931 | 1/1999 |
| WO | WO 00/70572 | 11/2000 |

OTHER PUBLICATIONS

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE INFOCOM 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bambooweb.com/articles/o/s/OSI_model.html, "Bambooweb OSI model," Bambooweb Dictionary, 5 pages, printed May 23, 2005.

http://www.dailywireless.org/modules.php?name=News&file=article&sid=871, "Location by Triangulation—Not," Daily Wireless, 2 pages, printed May 2, 2005.

http://www.unstrung.com/document.asp?site=unstrung&doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, No. 8, pp. 1344-1354, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Considerations for Direct-Conversion Receivers," IEEE Transactions on Circuits and Systems-II: Analog and Digital Signal Processing, vol. 44, No. 6, pp. 428-435, Jun. 1997.

Rofougaran et al., "A 1 GHz CMOS RF Front-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al. "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp. 1944-1950, Dec. 1991.

\* cited by examiner

WIRELESS APPLICATION INSTALLATION, CONFIGURATION AND MANAGEMENT TOOL

BACKGROUND

Various applications of wireless technology have been developed in recent years. These applications make use of a variety of data formats, frequencies, bit rates, etc. End users sometimes install multiple radio frequency (RF) systems to serve a number of applications. For example, a facility may use a first RF system to monitor a wireless security device network, a second RF system to monitor a wireless asset tracking system, and a third RF system to monitor environmental systems within the facility. Each system may come from a different manufacturer, may use different frequency bands, and/or may transmit data in differing formats or at different rates. Installation, maintenance, troubleshooting and optimization of such disparate systems can become a logistical challenge.

SUMMARY

The present invention, in an illustrative embodiment, includes a wireless configuration tool for communicating with and configuring wireless device systems. The illustrative tool makes use of a software defined radio (SDR) to communicate in multiple formats, modes, and/or frequencies, with wireless device systems that may otherwise be incompatible. In some embodiments, the tool determines what type and/or how many wireless systems are to be configured prior to configuration of one or more of the systems. The tool may be adapted to adjust how each system is configured, for example, to reduce interference or otherwise improve efficiency. Methods for performing such functions are also included.

DETAILED DESCRIPTION

The following detailed description should be read with reference to the drawings. The drawings, which are not necessarily to scale, depict illustrative embodiments and are not intended to limit the scope of the invention.

Figure 1:
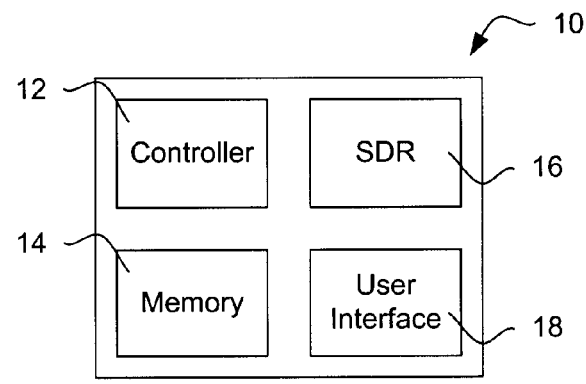
FIG. 1 is a block diagram of an illustrative embodiment of the present invention.

FIG. 1 is a block diagram of an illustrative embodiment of the present invention. An illustrative tool 10 for configuring wireless communication systems is shown and includes a controller 12, a memory 14, and a software defined radio (SDR) component 16. A user interface 18 is also shown.

The controller 12 may take any suitable form including, for example, various logic circuitry, processors and the like. In some embodiments, the controller 12 is or includes a microcontroller, a microprocessor, a digital signal processor, or other suitable components. The controller 12 may, for example, perform various activities for controlling the SDR 16, receive and respond to data from the SDR 16, access and write to the memory 14, and/or respond to requests or instructions from the user interface 18.

The illustrative memory 14 may also take a number of suitable forms allowing the controller 12 to access data within the memory 14. While portions of memory 14 may be read-only, preferably at least some of memory 14 is writable/rewritable memory, but this is not required. Memory 14 may be, for example, magnetic, optical, and/or electrical memory or combinations thereof.

The SDR 16 may also take any suitable form, and may be at least partially controlled by the controller 12 to, for example, enable communication to be defined by the controller 12. The SDR 16 may include a collection of hardware and software technologies that enable reconfigurable system architecture for a wireless terminal. The SDR 16 may be a multi-mode, multi-band, and/or multi-functional wireless device that may be enhanced using software upgrades even after initial set-up. SDR 16 may, in some cases, include multiple SDR modules, transceivers, etc., each controlled by the controller 12.

The user interface 18 may include, for example, a keypad, touchpad, graphical display, speakers, microphones, and/or other devices or features that may be used in allowing access and control by a user. In some embodiments, the tool 10 may resemble a PDA or laptop, though the specifics of packaging and form for the tool 10 may be subject to user preferences.

Figure 2:
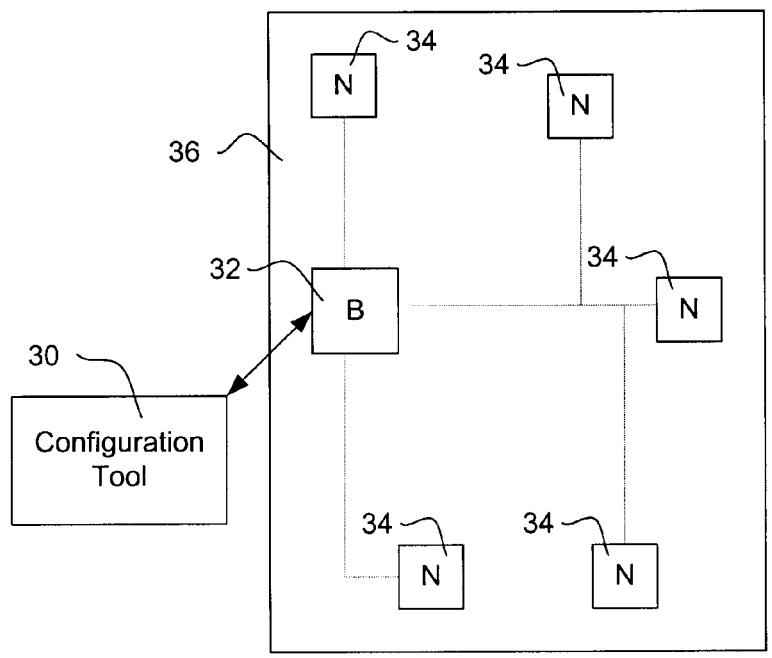
FIG. 2 is a schematic illustration of the use of an illustrative embodiment.

FIG. 2 is a schematic illustration of the use of an illustrative embodiment. A configuration tool 30 is shown in block form, communicating with a base station 32 that forms part of a wireless network including nodes 34. The network including the base station 32 is shown relative to a facility 36. The facility 36 may be, for example, a residential home or homestead, an industrial plant, or any other building or collection of buildings. The nodes 34 may take any suitable form or type and may be placed as desired, for example, indoors or outdoors.

In the illustrative embodiment, the nodes 34 are adapted to communicate with the base station 32. In some embodiments the nodes 34 may be sensors or may be coupled to sensors such as motion, fire, smoke, temperature, humidity, occupancy, process monitoring, or other sensors. The nodes 34 may also be cameras, microphones, intercoms or the like. In some embodiments, the nodes 34 may be repeaters, for example, if the base station 32 takes the form of an access point for wireless networking or other computer use. The base station 32 may take any suitable form, and may be adapted to communicate with at least some of the nodes 34.

The configuration tool 30 is used to perform at least certain functions in configuring, reconfiguring, installing, and/or management of the wireless network. For purposes herein, the term "configuring" or "configuration" is used inclusively to include various steps of configuration, installation, commissioning and management of a wireless system. Configuration need not be a complete process that configures, installs, commissions or manages every aspect of a device in a wireless system or every aspect of a system in communication proximity to the configuration tool 30. It is sufficient to note that a device is configured whenever an operational aspect of the device is modified, selected, or set to affect how the device interacts with other devices within its wireless network.

In the illustrative embodiment shown, the configuration tool 30 communicates with the base station 32 and effects configuration of the base station 32. To perform this activity, the configuration tool 30 makes use of an SDR and an instruction set for performing a first communication protocol that is used by the base station 32. The instruction set may be stored in a memory of the configuration tool 30, and may be updated from time to time, if desired. For example, an instruction set may be loaded onto the configuration tool 30 for the purpose of adapting the configuration tool 30 for configuring the base station 32. Such an instruction set may include instructions for use of the first communication protocol by the SDR. The same or another instruction set may include device-specific instructions for configuring the base station. The configuration tool can also be used to either directly configure the nodes 34 or indirectly configure the nodes 34 through the base station 32.

In some embodiments, the configuration tool 30 may itself select and/or modify an instruction set for configuring the base station 32, for example, by observing characteristics of the base station 32 and/or its network of nodes 34, by observing characteristics of the facility 36, and/or by determining whether, what type, and how many other wireless systems are present in or near the facility 36. In some embodiments, other wireless systems may interfere with network operation including, for example, those that use, transmit on, or may create noise on channels that are used by a particular network. Such systems may be described as being in communication proximity.

Figure 3:
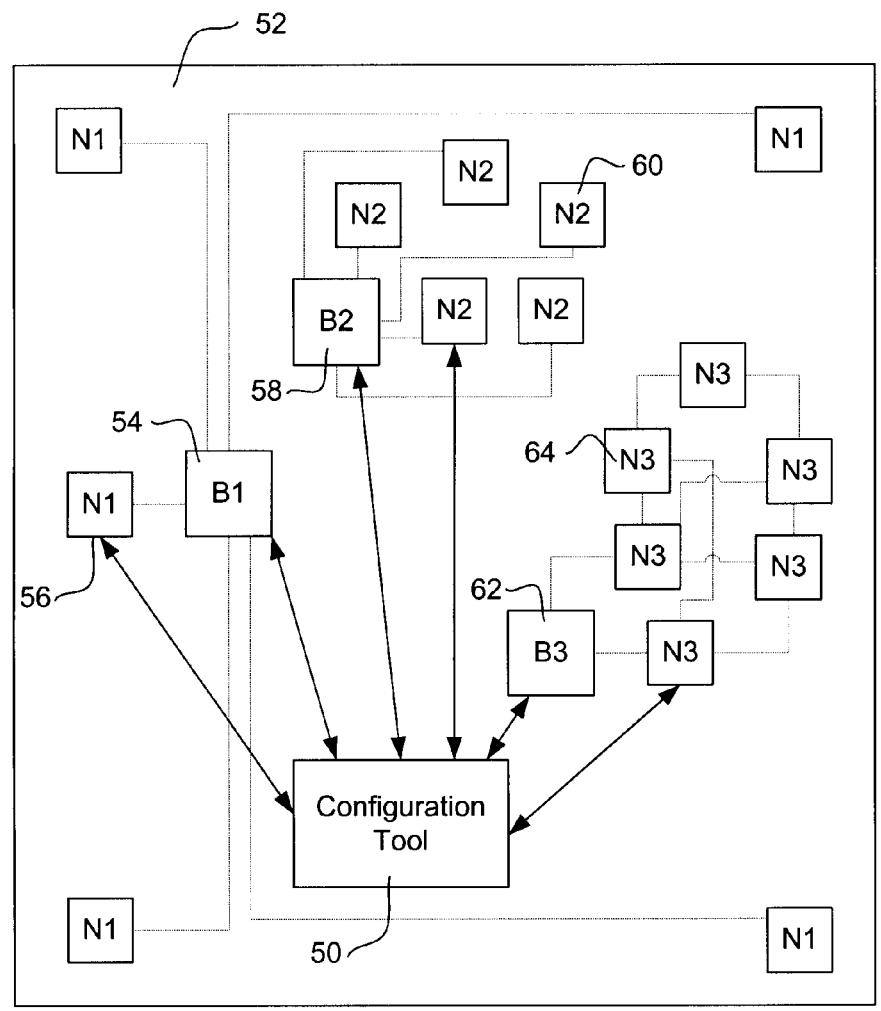
FIG. 3 is another schematic illustration of the use of an illustrative embodiment.

FIG. 3 is another schematic illustration of the use of an illustrative embodiment. The illustrative embodiment shown in FIG. 3 includes a configuration tool 50 that is located such that it may communicate with various wireless systems within a facility 52. A first such system includes base station B1, shown at 54, and nodes N1, for example as shown at 56. A second system includes base station B2, shown at 58, and nodes N2, for example as shown at 60. A third system includes base station B3, shown at 62, and nodes N3, for example as shown at 64. Though not shown, individual systems may include multiple base nodes or gateway nodes, if desired.

In the illustrative embodiment, the configuration tool 50 makes use of an SDR to generate communication beacons in at least a first mode or format. In some embodiments, the configuration tool 50 generates communication beacons in a plurality of modes or formats such that each of several systems may be contacted within the facility 52. When a beacon is sent out by the configuration tool 50, responses are noted such that the configuration tool 50 can determine what type and/or how many systems are present within the facility 52. After each system is contacted and identified, after a set of communications protocols is exhausted, and/or after a predetermined discovery time period (or set of discovery time periods) has expired, the configuration tool 50 may contact each of the detected systems or system devices to configure communications within the facility 52. Alternatively, the configuration tool 50 may configure each system as it is discovered.

In some embodiments, the configuration tool 50 includes a controller, input/output devices, and memory allowing communication protocols to be downloaded prior to use. For example, RF, USB, optical, and/or external disc drive ports may be provided on the configuration tool 50 to allow it to load a communication protocol into its memory. In this fashion, the configuration tool 50 may be configured to execute communication commands using a number of different protocols and, further, may be updated when new or different protocols come into use.

In some embodiments, the configuration tool 50 is adapted to configure only certain portions of the various systems it configures. For example, the configuration tool 50 may configure only the base stations 54, 58, 62. Alternatively, the configuration tool 50 may configure additional detected devices such as one or more of nodes 56, 60, 64.

The third system is shown for illustrative purposes as being redundantly connected, with nodes N3 connected to multiple other nodes, defining a plurality of redundant paths to the base station 62. In some embodiments, the configuration tool 50 may be used to define the redundant paths within at least portions of such a redundant system, for example as set forth in copending U.S. patent application Ser. No. 11/160,779, entitled WIRELESS ROUTING IMPLEMENTATION, which is incorporated herein by reference. The configuration tool 50 may also analyze an existing routing configuration and/or system characteristics to determine whether reconfiguration is desirable, as set forth in copending U.S. patent application Ser. No. 10/905,971, entitled WIRELESS ROUTING SYSTEMS AND METHODS, the disclosure of which is also incorporated herein by reference.

The configuration tool 50 may perform functions such as, for example, the selection and commissioning of security protocols. The configuration tool 50 may further provide network management and access functionality to aid in software and hardware updates, for example. In some embodiments, global rules or regulations for the various networks in use may be selected, updated, commissioned or configured by the configuration tool 50.

In some embodiments, the configuration tool 50 is adapted to receive new instruction sets for configuration. A new communication instruction may be uploaded to the configuration tool, by the use of removable media (such as a compact disk, magnetic disk, or flash memory card, for example), by wired communication (via a USB port, modem, optical input or any other suitable wired communication), via wireless communication or by any other suitable method/device. The new instruction may be loaded to a controller readable media such as a RAM, ROM, flash memory or other suitable memory components. The configuration tool 50 may then communicate with one or more other wireless devices to configure one or more wireless devices using the new communication instruction.

Figure 4:
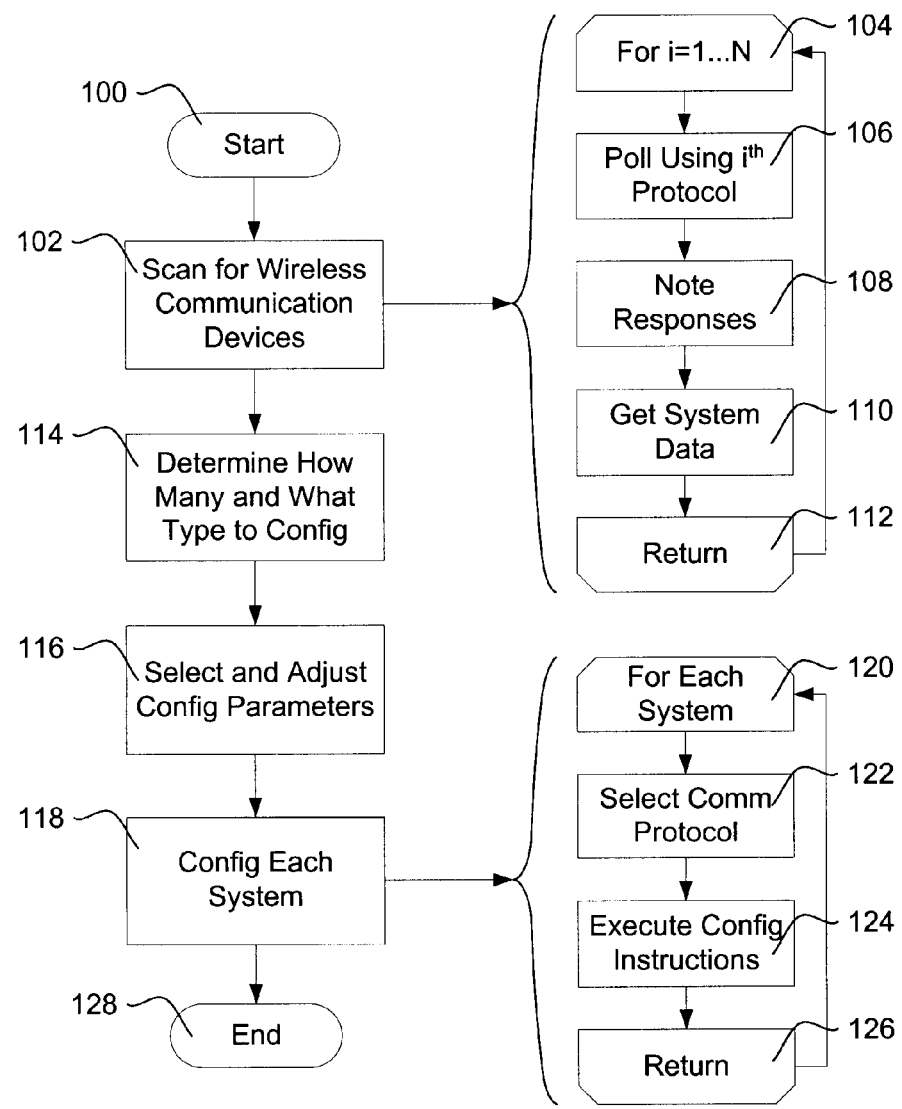
FIG. 4 is a flow chart showing an illustrative method embodiment.

FIG. 4 is a flow chart showing an illustrative method in accordance with an example embodiment of the present invention. From start block 100, the method begins at 102 by scanning for wireless communication devices. Step 102 may include its own "sub-method" as shown to the right. For example, in an illustrative embodiment a configuration tool may be adapted to observe devices operating using one of a number, N, of communication protocols. As noted at step 104, for the N protocols, the sub-method includes polling using an $i^{th}$ protocol, as shown at 106, noting any responses to the polling, as shown at 108, and retrieving system data from each system/device that responds, as shown at 110. The sub-method returns to the top, as shown at 112, for each of the N loaded protocols. In some embodiments, a user may select which protocols are to be used among a set of available protocols on the configuration tool.

Once the scan for devices step at 102 is complete, the method includes analyzing the data captured from scanning to determine how many and/or what type of devices may be configured, as shown at 114. Next, the parameters for configuration are selected and adjusted, as shown at 116. This may include, for example, adjusting communication timing to allow multiple systems to operate within limited bandwidth. The parameters for configuration may also include, for example, parameters related to which among several possible channels are designated for particular communications within the available networks. For example, a first network capable of using a channel C may be directed to not use it so channel C may be reserved for use by a second network.

After the configuration parameters are selected and/or adjusted in step 116, the method includes configuring each system, as shown at 118. Step 118 may include its own sub-method, as shown to the right. As noted at 120, for each subsystem, the configuration tool may perform a number of steps. First in the illustrative method, the appropriate communication protocol is selected, as shown at 122. Next, the configuration instructions are executed, as shown at 124. The method then returns to step 120 for the next system. After each selected system is configured, the method ends as shown at 128.

The present invention, in another illustrative embodiment, includes a tool for configuring wireless communication systems comprising an SDR adapted for wireless communication using at least a first communication protocol, a controller for the SDR having functionality to execute the first communication protocol, and controller readable media accessible by the controller and including one or more instruction sets for configuration of a wireless system that uses the first communication protocol. The SDR may be further adapted for wireless communication using a second communication protocol, the controller may have functionality to execute the second communication protocol, and the controller readable media may further include one or more instruction sets for configuration of a wireless system that uses the second communication protocol. The first wireless system may be communicatively incompatible with the second wireless system.

In some embodiments, the controller readable media is writable. When a first wireless system is configured, the controller may record data related to the configuration of the first wireless system. Another embodiment includes a tool wherein the controller is adapted to perform a configuration sequence comprising using the SDR to determine what wireless systems are to be configured in a facility, adjusting an instruction set for configuration of a wireless system corresponding in light of the wireless systems that are to be configured, and executing at least one of the one or more instruction sets to configure at least one wireless system in the facility. The controller may be adapted to perform reconfiguration of wireless communication systems by the use of at least portions of at least one of the one or more instruction sets for configuration of a wireless system.

Yet another illustrative embodiment includes a tool for configuring wireless communication systems comprising an SDR adapted for wireless communication using at least first and second communications protocols, and a controller for the SDR capable of: configuring a first wireless system using the first communication protocol, and configuring a second wireless system using the second communication protocol. The first wireless system may be communicatively incompatible with the second wireless system. The controller may be further adapted to store data related to configurations of the first and second wireless systems.

The controller may be adapted to modify the second instruction set when the first wireless system is configured. The controller may also be adapted to perform a configuration sequence comprising using the SDR to determine what wireless systems are to be configured in a facility, adjusting an first instruction set for use in configuring a wireless system in light of the wireless systems that are to be configured, and executing at least one of the first instruction set or the second instruction set to configure at least one wireless device system in the facility.

Another embodiment of the present invention includes a method of configuring wireless communication systems comprising providing a device including an SDR adapted for wireless communication using at least a first communication protocol, a controller for the SDR having functionality to execute the first communication protocol, and controller readable media accessible by the controller and including one or more instruction sets for configuration of a wireless system using the first communication protocol, using the SDR to communicate using the first communication protocol with a first wireless device that is part of a first wireless communication system, and configuring the first wireless device by executing an instruction set for configuration of a wireless system using the first communication protocol via the SDR.

The SDR may be adapted for wireless communication using a second communication protocol, wherein the controller for the SDR has functionality to execute the second communication protocol and the controller readable media includes one or more instruction sets for configuration of a wireless system using the second communication protocol. Then, the method may further comprise using the SDR to communicate using the second communication protocol with a second wireless device that is part of a second wireless communication system, and configuring the second wireless device by executing an instruction set for configuration of a wireless system using the second communication protocol via the SDR.

The SDR may be used to discover the first wireless communication system, and to determine what additional wireless communications systems are located in communication proximity to the first wireless communication system. A step of determining what additional wireless communications systems are located in communication proximity may include determining what type and/or how many wireless communication systems are located in communication proximity. An example method may include as step of selecting a variable in an instruction set executed in configuring the first wireless device in view of what additional wireless communications systems are located in communication proximity to the first wireless communication system.

Another example method may include a step of recording data related to the configuration of the first wireless device. The SDR may be adapted for wireless communication using a second communication protocol, the controller having functionality to execute the second communication protocol, and the controller readable media includes one or more instruction sets for configuration of a wireless system using the second communication protocol. In this example, the method may further comprise using the SDR to communicate using the second communication protocol with a second wireless device that is part of a second wireless communication system, and configuring the second wireless device by executing an instruction set for configuration of a wireless system using the second communication protocol via the SDR.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A tool for remotely configuring wireless networks, the tool comprising:
   a software defined radio (SDR) configured for using at least a first communication protocol for remotely communicating with a first wireless network that includes at least two first network devices, and for using a second communication protocol for remotely communicating with a second wireless network that includes at least two second network devices;
   a controller for the SDR having functionality to execute the first communication protocol and the second communication protocol; the controller is configured to generate communication beacons on each of the first and second wireless networks via the SDR, and note any responses to determine which of the first and second wireless networks are capable of remotely communicating with the tool;

controller readable media accessible by the controller, the controller readable media including:

one or more first instruction sets that, if the tool is remotely communicating with the first wireless network as determined by the controller via the generated communication beacons, allow remote configuration of the first wireless network by adjusting one or more communication parameters on at least one of the first network devices to adjust communication between one or more of the first network devices and one or more of the other first network devices across the first wireless network; and one or more second instruction sets that, if the tool is remotely communicating with the second wireless network as determined by the controller via the generated communication beacons, allow remote configuration of the second wireless network by adjusting one or more communication parameters on at least one of the second network devices to adjust communication between one or more of the second network devices and one or more of the other second network devices across the second wireless network.

2. The tool of claim 1 wherein the first wireless network is communicatively incompatible with the second wireless network.

3. The tool of claim 1 wherein the controller readable media can be written to and rewritten in response to commands from the controller.

4. The tool of claim 3 wherein, when the first wireless network is configured, the controller is configured to record data related to the configuration of the first wireless network to the controller readable media.

5. The tool of claim 1 wherein the controller is configured to perform a configuration sequence comprising:
using the SDR to determine the wireless networks that can be configured in a facility;
adjusting the one or more instruction sets for configuration of the first or second wireless network in light of the wireless networks that are to be configured; and
executing at least one of the one or more instruction sets to configure at least one of the first and second wireless networks in the facility.

6. The tool of claim 1 wherein the controller is configured to perform reconfiguration of wireless networks by the use of at least portions of at least one of the one or more instruction sets for configuration of the first and/or second wireless network.

7. The tool of claim 1 wherein the controller is configured to receive information relating to a new communication protocol and write instructions for the new communication protocol to the controller readable media.

8. A tool for remotely configuring wireless networks, each of the wireless networks including two or more wireless devices that are separate from the tool, the two or more wireless devices of each wireless network capable, when configured, of communicating with each other within their wireless network, the tool comprising:
a software defined radio (SDR) configured for using at least first and second communications protocols for remotely communicating with a first wireless network and a second wireless network; and
a controller for the SDR programmed for generating communication beacons on each of the first and second wireless networks via the SDR, and note any responses to determine which of the first and second wireless networks are capable of remotely communicating with the tool:

if it is determined from the communication beacons that the tool is capable of remotely communicating with the first wireless network, allowing at least one wireless device of the first wireless network to be remotely configured with a first configuration using the first communication protocol such that, once configured with the first configuration via the tool and after the tool is disconnected from the first wireless network, the at least one wireless device of the first wireless network will operate on the first wireless network in accordance with the first configuration, and if it is determined from the communication beacons that the tool is capable of remotely communicating with the second wireless network, allowing at least one wireless device of the second wireless network to be remotely configured with a second configuration using the second communication protocol such that, once configured with the second configuration via the tool and after the tool is disconnected from the second wireless network, the at least one wireless device of the second wireless network will operate on the second wireless network in accordance with the second configuration, and wherein the tool is separate from the devices of the first wireless network and the devices of the second wireless network.

9. The tool of claim 8 wherein the first wireless network is communicatively incompatible with the second wireless network.

10. The tool of claim 8 wherein the controller is further configured to store data related to configurations of the first and second wireless networks.

11. The tool of claim 8 wherein the controller is configured to modify an instruction set after the first wireless network is configured.

12. The tool of claim 8 wherein the controller is programmed to perform a configuration sequence comprising:
using the SDR to determine the wireless networks that can be configured in a facility;
adjusting a first instruction set for use in configuring at least one of the first and second wireless networks in light of the wireless networks that are to be configured; and
executing the first instruction set to configure at least one wireless device in the facility.

13. A method of remotely configuring wireless networks, the method comprising:
providing a configuration device including a software defined radio (SDR) configured for using at least a first communication protocol and a second communication protocol for remotely configuring a first wireless network and a second wireless network, respectively, a controller for the SDR programmed to execute the first communication protocol and the second communication protocol, and controller readable media accessible by the controller and including one or more instruction sets for remotely configuring the first wireless network using the first communication protocol, and including one or more instruction sets for remotely configuring the second wireless network using the second communication protocol generating communication beacons on each of the first and second wireless networks via the SDR, and note any responses to determine which of the first and second wireless networks are located in communication proximity with the configuration device;

if it is determined from the communication beacons that the first wireless network is located in communication proximity with the configuration device, allowing the SDR to communicate using the first communication protocol with a first wireless device that is separate from the configuration device and is part of a first wireless network;

remotely configuring the first wireless device with a first configuration by executing an instruction set for configuration of the first wireless network using the first communication protocol via the SDR; and wherein, once the first wireless device is remotely configured with the first configuration, the first wireless device operates on the first wireless network using the first configuration even after the configuration device is removed and stops communicating with the first wireless device.

14. The method of claim 13 further comprising:

if it is determined from the communication beacons that the second wireless network is located in communication proximity with the configuration device, allowing the SDR to communicate using the second communication protocol with a second wireless device that is separate from the configuration device and is part of a second wireless network; and remotely configuring the second wireless device with a second configuration by executing at least one of the one or more instruction sets for configuration of the second wireless network using the second communication protocol via the SDR; and wherein once the second wireless device is remotely configured with the second configuration, the second wireless device operates on the second wireless network using the second configuration.

15. The method of claim 13 further comprising:

determining additional wireless networks that are located in communication proximity to the configuration device.

16. The method of claim 15 wherein the step of determining additional wireless networks that are located in communication proximity to the configuration device includes determining a type and a number of wireless networks that are located in communication proximity to the configuration device.

17. The method of claim 15 further comprising setting a variable in an instruction set executed in configuring the first wireless device in view of the additional wireless networks that are located in communication proximity to the first wireless network.

18. The method of claim 13 further comprising the step of recording data related to the configuration of the first wireless device.

19. The method of claim 13 further comprising:

loading a new communication protocol to the controller readable media; and configuring a wireless device for operation using the new communication protocol by communicating via the SDR to the wireless device.

20. The tool of claim 8, wherein the two or more wireless devices of at least one of the first and second wireless networks includes one or more nodes.

21. The tool of claim 9, wherein the two or more wireless devices of at least one of the first and second wireless networks includes a base station.

* * * * *